United States Patent [19]

Cann et al.

[11] 4,178,988
[45] Dec. 18, 1979

[54] CONTROL FOR A COMBINATION FURNACE AND HEAT PUMP SYSTEM

[75] Inventors: Peter L. Cann, Canastota, N.Y.; Phil J. Karns, Sanibel, Fla.; Fred V. Honnold, Fayetteville, N.Y.

[73] Assignee: Carrier Corporation, Syracuse, N.Y.

[21] Appl. No.: 850,180

[22] Filed: Nov. 10, 1977

[51] Int. Cl.² .............................................. F25B 13/00
[52] U.S. Cl. ......................................... 165/2; 165/17; 165/29
[58] Field of Search ............... 165/29, 17, 2; 62/156, 62/160

[56] References Cited

U.S. PATENT DOCUMENTS

| | | | |
|---|---|---|---|
| 2,806,674 | 9/1957 | Biehn | 165/29 |
| 2,847,190 | 8/1958 | Slattery et al. | 62/156 |
| 2,902,220 | 9/1959 | Myck et al. | 165/29 X |
| 3,167,114 | 1/1965 | Swart | 165/29 X |
| 3,173,476 | 3/1965 | McCready | 165/17 |
| 3,283,809 | 11/1966 | Eberhart | 165/29 |
| 3,318,372 | 5/1967 | Shell | 165/29 |
| 3,404,729 | 10/1968 | De Armott et al. | 165/29 |
| 3,444,923 | 5/1969 | Kyle et al. | 165/29 |
| 3,537,509 | 11/1970 | Ferdelman | 165/29 |
| 3,556,203 | 1/1971 | Kyle | 165/29 |
| 3,996,998 | 12/1976 | Garst et al. | 165/29 X |

Primary Examiner—Albert W. Davis, Jr.
Assistant Examiner—Margaret A. Focarino
Attorney, Agent, or Firm—J. Raymond Curtin; Robert P. Hayter

[57] ABSTRACT

A control circuit for a combination furnace and heat pump wherein a temperature dependent relay is connected to a thermostat such that the heat pump is operated to supply heat to an enclosure when the outdoor temperature is above a predetermined level and the furnace is operated to supply heat to the enclosure when the outdoor temperature is below a predetermined level. To defrost the outdoor coil of the heat pump the furnace is operated to supply heat to the indoor coil of the heat pump and a reversing valve relay is energized whereby the heat pump is operated in a reverse direction to supply heat to the outdoor coil for defrost.

10 Claims, 2 Drawing Figures

CONTROL FOR A COMBINATION FURNACE AND HEAT PUMP SYSTEM

BACKGROUND OF THE INVENTION

1. Field of the Invention

The present invention relates to control systems for use in supplying conditioned air to an enclosure. More particularly the present invention relates to a control system for coordinately synchronizing a heat pump and a furnace to condition the air of an enclosure.

2. Description of the Prior Art

It has been determined that a heat pump is capable of supplying sufficient quantities of heated air to meet many residential and commercial heating applications. The use of a heat pump to transfer heat from an area where loss of heat is not important to an area where heat is required is a very efficient method of heating an enclosure. Many heat pumps commercially available are capable of transferring up to two or three times the amount of heat from one area to another with a given amount of electricity as the amount of heat that would be generated if that same amount of electricity were used for electrical resistance heating. A heat pump having a high coefficient of performance may also be more efficient than a fuel fired furnace and with proper use results in an overall energy usage savings for a given amount of heating.

Heat pumps are, however, limited in overall application since for a heat pump to operate it must be capable of removing heat from one area and transferring that heat to the area or enclosure to be heated. Heat pumps of modern day design are capable of performing this operation at temperatures as low as 10 to 15 degrees Fahrenheit while maintaining a satisfactory coefficient of performance. However, below this temperature, the heat pump has to work so hard to absorb heat from the colder ambient air that its efficiency is decreased to the point where other forms of heating use less energy and consequently are less costly.

Heat pumps also have the disadvantage that when the refrigerant in the outdoor coil is being evaporated to absorb heat from the ambient air, the air adjacent thereto is cooled below the freezing point and as it is cooled the moisture in the air is precipitated onto the outdoor coil surface resulting in a frost or ice buildup thereon. As frost builds the coil rapidly loses its ability to transfer heat.

It has been found that below certain outdoor temperatures it is both economical and advantageous to use conventional furnace type heating to heat an enclosure. This may include the use of electrical resistance heat or a conventional gas or oil fired furnace. The point at which it is desirable to switch from the use of a heat pump to the use of the alternate heat source is called the balance point. This point may be chosen either based on the economics of operating the heat pump versus the furnace or may be chosen solely on the basis of the capability of the heat pump for supplying sufficient heat to the enclosure.

Typically many homes or residential applications have had a gas or oil burning furnace installed as original equipment when the residence was constructed. Many of these homes likewise have air conditioning equipment with a heat exchanger installed within the furnace supply duct to the area to be conditioned. For an application having a furnace and an air conditioner it is relatively simple to install a control such that the air conditioner is utilized as a heat pump when the weather conditions are such that the heat pump is more efficient and likewise to operate the furnace when it is more efficient. Furthermore it may be economical to install a heat pump in combination with an existing furnace to realize the economies of heating with the heat pump at relatively higher outdoor temperatures.

Considerable prior art exists in relation to the use of auxiliary heat sources with a heat pump. These auxiliary heat sources have typically been electrical resistance heaters incorporated within the heat pump unit such that no other heating source is required within the enclosure to provide adequate heating capacity at all normal outdoor temperatures.

Typical of the prior art utilizing electrical resistance heat in combination with the heat pump is U.S. Pat. No. 3,173,476 issued to McCready and assigned to Carrier Corporation, the assignee hereof. This patent discloses the use of an outdoor thermostat in series with a multi-stage indoor thermostat. The outdoor thermostat designated 58 therein is so arranged that the auxiliary electric heater may not be turned on until the outdoor temperature reaches a predetermined level. Once the outdoor temperature reaches that level then, when the indoor temperature falls more than a predetermined amount below the desired temperature, thermostat 47 is engaged and the auxiliary electrical heat is turned on. Prior to the auxiliary heating elements being energized the indoor thermostat determines when heating is needed and actuates the heat pump. The auxiliary heat is supplied in combination with the heat pump such that both operate to provide heating when the outdoor temperature is below a predetermined level and when the indoor temperature is a predetermined amount below the desired indoor temperature level.

Other prior art utilizing multi-stage indoor thermostats to determine when the auxiliary electric resistance heat should be commenced include Shell, Pat. No. 3,318,372; Ferdelman, U.S. Pat. No. 3,537,509; and Kyle, U.S. Pat. No. 3,556,203.

Other patents have utilized the temperature of the refrigerant returning to the compressor to ascertain when auxiliary heat is required. See U.S Pat. No. 3,283,809 issued to Eberhart and U.S. Pat. No. 3,404,729 issued to Armott.

Another method of controlling the transfer from heat pump heating to auxiliary heating is the utilization of a series of outdoor thermostats such that the auxiliary heat is brought on in stages by the various thermostats. For examples of this manner of control see U.S. Pat. No. 3,444,923 issued to Kyle, et al. and U.S. Pat. No. 2,806,674 issued to Biehn.

A further method of controlling the inter-reaction of auxiliary heat with the heat pump is disclosed in U.S. Pat. No. 2,902,220 issued to Myck, Jr., et al. Therein a step controller determines the length of time that indoor thermostats call for heat and based on the length of time activates auxiliary heaters in sequence.

A different method is shown in U.S. Pat. No. 3,537,509 issued to Ferdelman wherein upon the outdoor temperature reaching a certain level resistance heat is automatically engaged and heat pump operation discontinued and upon the indoor temperature continuing to fall thereafter auxiliary resistance heat is brought on line by a second stage of the indoor thermostat.

In U.S. Pat. No. 3,996,998 issued to Garst, et al., and entitled "Combination Furnace-Heat Pump Unit" there is disclosed a heat pump in combination with a furnace having various controls for determining whether the heat pump or the furnace will be operated. More particularly in the heating mode the thermostat 68 determines the temperature of the air within the enclosure and has a first threshold temperature at which the heat pump is activated. The heat pump alone supplies heat until a second lower indoor threshold temperature is reached. This lower temperature is reached because the heat pump is not able to meet the heating load under these particular weather conditions. At that time the furnace is activated for additional heating capacity and the heat pump operation is discontinued. A thermal-switch 56 is utilized such that the indoor coil of the heat pump is never allowed to be operated when the supply air temperature is contact therewith exceeds 115° F. Consequently, whenever operation is switched from the furnace to the heat pump it is necessary that there be a delay involved to allow the supply air within the duct to cool. A temperature differential switch 60 is utilized such that when a predetermined differential as exceeded defrost is initiated. Consequently in defrost the heat pump is reversed and the furnace turned on such that the heat from the furnace may be used to help defrost the outdoor coil.

None of the above enumerated patents utilizes a combination heat pump and furnace wherein the control mechanism for selecting either heat pump operation or furnace operation is dependent solely on the outdoor ambient air temperature. In Eberhart, U.S. Pat. No. 3,283,809, a sensing element 44 is utilized to switch between heat pump operation and electrical resistance heat based on the lower of either the temperature of the ambient air or the refrigerant in the outdoor coil. In Ferdelman, U.S. Pat. No. 3,537,509, a temperature switch 143, being dependent on ambient air temperature, switches between first stage resistance heating and heat pump operation. Upon a further fall in indoor temperature the two stage room thermostat then switches on an additional auxiliary resistance heater. Furthermore, none of the references disclosed utilizes the defrost thermostat built into the heat pump for controlling the combination operation of the furnace and the heat pump. In particular, these references do not utilize the defrost thermostat to prevent excessive refrigerant pressures or temperatures in the heat pump system on changeover between furnace and heat pump operation when the unit is cycled in the defrost mode of operation.

SUMMARY OF THE INVENTION

An object of the present invention is to provide an improved efficient and reliable combination heat pump and furnace system for conditioning the air to an enclosure.

It is a further object of the present invention to provide a heating system effectively combining a furnace with a heat pump.

It is another object of the present invention to provide a control circuit for coordinately controlling the operation of a combined furnace and heat pump system.

It is another object of the present invention to provide a thermostat control dependent solely on the outdoor ambient air temperature for selectively energizing either a heat pump or a furnace for heating an enclosure.

It is another object of the present invention to provide a control mechanism for installation with an existing furnace and heat pump for synchronously controlling the operation of both.

It is yet another object of the present invention to utilize the defrost thermostat within the heat pump to control and monitor the energy level of the heat pump system.

It is a further object of the present invention to provide a combination heat pump and furnace that is not dependent upon a complicated system of field installed air temperature switches.

It is yet a further object of the present invention to provide a control system which may be manually overridden to call for emergency heat from the furnace notwithstanding the outdoor temperature.

It is still a further object of the present invention to utilize the heat generated by the furnace to aid the heat pump operation when the outdoor coil is being defrosted.

Other objects will be apparent from the description to follow and from the appended claims.

The preceding objects are achieved according to a preferred embodiment of the invention by the provision of a fuel fired furnace having a furnace blower for circulating air throughout the enclosure to be cooled and a heat pump having an indoor coil mounted within the supply duct coming from the furnace. The heat pump has an outdoor coil mounted outside the exterior of the enclosure and an indoor coil mounted within the supply duct from the furnace, said coils being connected by a compressor and reversing valve such that the operation of the heat pump may be reversed depending upon the mode of operation. A control circuit is provided such that when the outdoor temperature is above a certain level the heat pump is operated to supply heat to the enclosure and when the outdoor temperature is below a predetermined level the furnace is operated to supply heat to the enclosure. The control system further provides for furnace operation when the heat pump is in the defrost mode such that heat generated by the furnace may be utilized by the heat pump to aid in defrosting the outdoor coil. The defrost thermostat provided in the outdoor coil determines when defrost is necessary and at that time in conjunction with a timer cycles the furnace on and reverses the heat pump. There are no built in thermal delays or air temperature switches which provide for a delay when the combination unit switches between furnace operation and heat pump operation including defrost operation.

DESCRIPTION OF THE PREFERRED EMBODIMENT

The embodiment of the invention described below is adapted for use with a furnace and/or a heat pump which have already been installed within the enclosure to be conditioned. It is to be further understood that this control system may be utilized as part of a new installation or with an installation of a heat pump in combination with an existing furnace or a furnace in combination with an existing heat pump. Furthermore, this invention may be utilized in combination with electric strip heat or heat supplying equipment other than a furnace.

Figure 1:
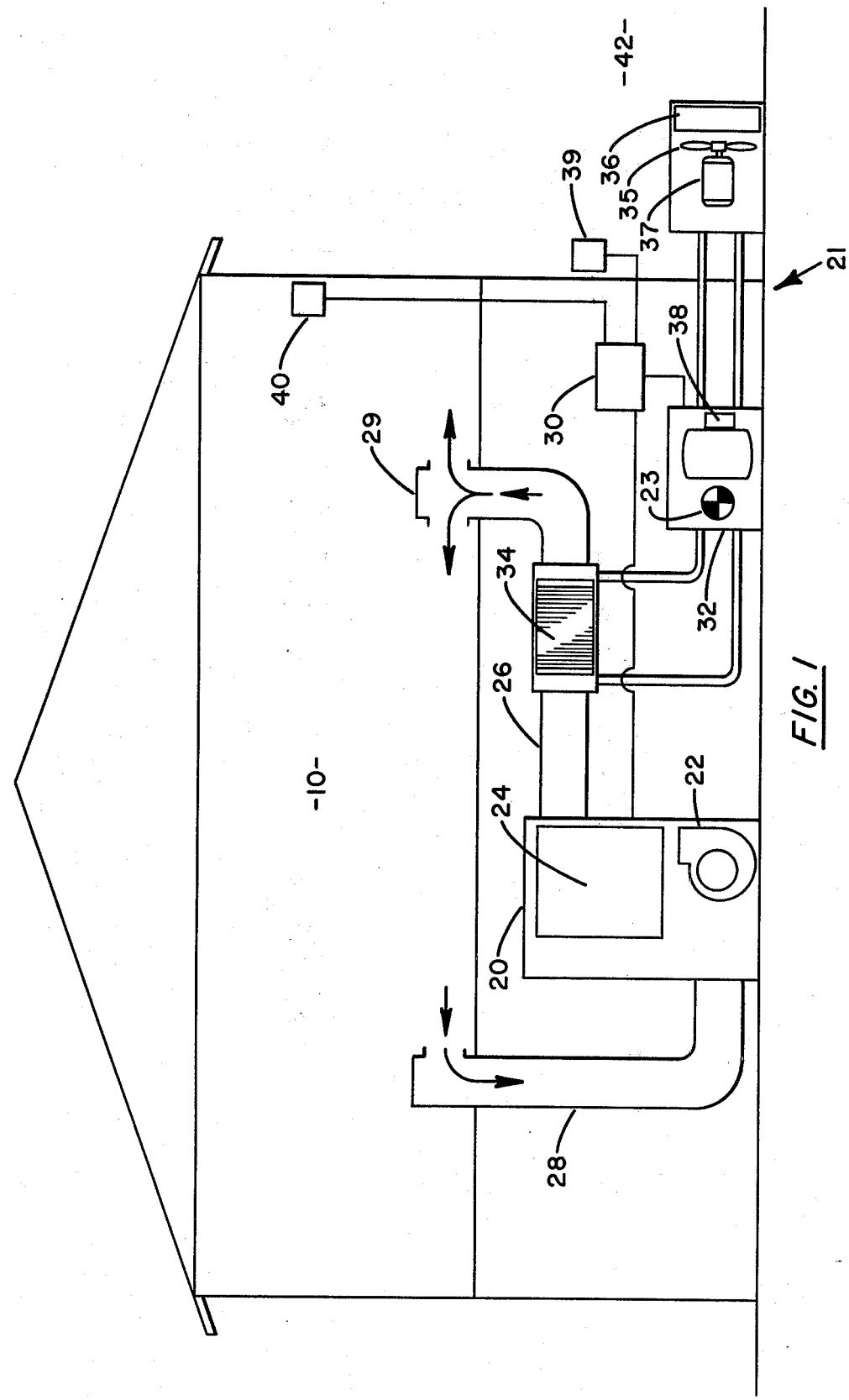
FIG. 1 is a diagramatic view of an enclosure schematically illustrating a furnace and a heat pump mounted therein in accordance with the invention.

Referring now to FIG. 1, a plan view of the enclosure 10 it can be seen that furnace 20 is mounted such that cold air from the enclosure is received by the furnace through cold air return 28 and thereafter hot air from the furnace is supplied to the enclosure through supply ducts 26 and hot air supply 29 to the enclosure. The furnace has a furnace blower 22 for circulating the air from the enclosure through the cold air return to the furnace and through the furnace heat exchangers 24 through supply duct 26 and back to the enclosure through hot air supply 29.

It can also be seen in FIG. 1 that heat pump 21 is mounted such that indoor coil 34 is contained within supply duct 26 in communication with the enclosure air being circulated by the furnace blower and that outdoor coil 36 is mounted outside of the enclosure in communication with the ambient air 42. The indoor coil 34 and the outdoor coil 36 are connected through reversing valve 23 to compressor unit 32. Defrost temperature switch 38 is mounted on a discharge line from the outdoor coil 36 and outdoor fan 35 which is powered by outdoor fan motor 37 is located such that ambient air is circulated through the outdoor coil 36.

It can also be seen in FIG. 1 that control box 30 is arranged to control furnace blower ignition and operation, compressor unit 32 operation and operation of the reversing valve and the defrost temperature switch. Control box 30 is also connected to thermostat 40 for sensing the temperature of the air in enclosure 10 and to outdoor bulb 39 for sensing the temperature of ambient air 42.

Figure 2:
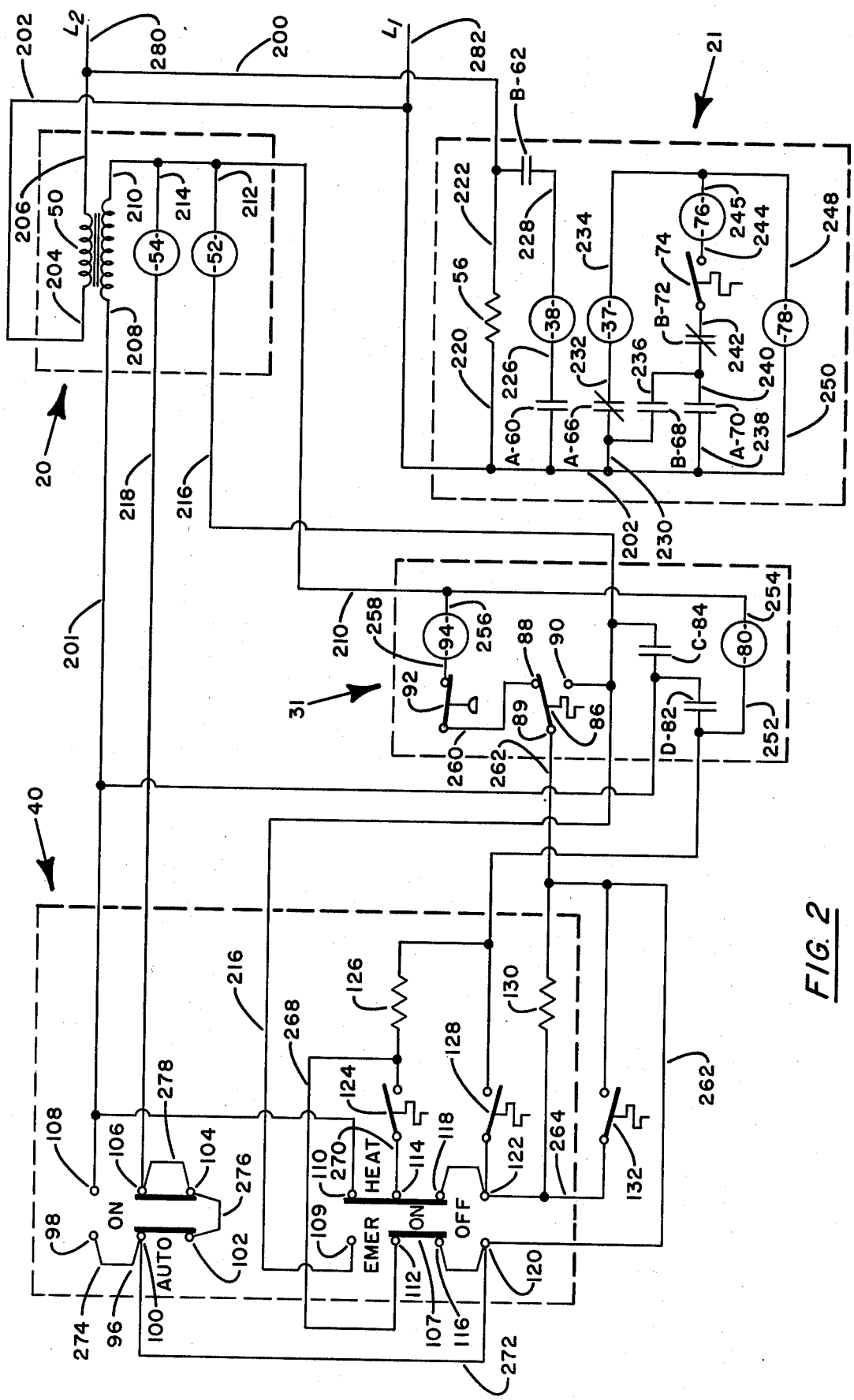
FIG. 2 is a schematic wiring diagram of the control circuit showing wiring for the thermostat, furnace, heat pump and for the control system to coordinately regulate the operation of the various components.

Referring now to FIG. 2 it can be seen that schematically the control circuit can be broken down into four connected blocks, thermostat 40, furnace 20, heat pump 21, and switching control 31. Each of these blocks is denoted by a dashed line enclosing the various components thereof. Terminals 280 and 282 are line terminals that are connected to the power source available within the household or enclosure. Power is supplied from terminal 282 through wire 202 to wire 204 which is engaged to the primary coil of transformer 50. The opposite side of primary coil transformer 50 is engaged by wire 206 to ground wire 200. Also engaged to wire 202 within heat pump 21 are wire 220, crankcase heater 56, normally open to compressor relay A contacts 60, wire 226 to compressor motor 38, wire 230 to normally closed defrost relay A contacts 66, wire 232 to outdoor fan motor 37, wire 230 to normally open defrost relay B contacts 68 to wire 236 and to wire 240. Wire 202 is also connected to wire 238, to defrost timer normally open A contacts 70, wire 240, normally closed defrost timer relay B contacts 72, wire 242, defrost thermostat 74, wire 244, defrost relay 76 and wire 250 to defrost timer 78. Within heat pump 21 wire 200 is connected to wire 222 to crankcase heater 56 and to compressor relay B contacts 62. When the compressor relay is closed compressor relay B contacts 62 are closed and wire 200 then continues on and connects to wire 228 to compressor motor 58, wire 234 to outdoor fan motor 37, wire 245 to defrost relay 76 and wire 248 to defrost timer 78.

Within furnace 20 the secondary coil of transformer 50 is connected by wire 210 to wire 212 and gas valve 52, to wire 214 and furnace blower relay 54, and to wire 256 and compressor relay 94 of switching control 31 as well as wire 254 to reversing relay 80 of switching control 31. The other side of the secondary coil of transformer 50 is connected by wire 208 to wire 201. Furnace blower relay 54 is connected by wire 218 to terminal 106 of fan switch 96 of thermostat 40. Gas valve 52 is connected by wire 216 to terminal 90 of the optimizer relay and to terminal 108 of the system switch 107.

Thermostat 40 has fan switch 96 for selecting either automatic furnace blower operation or continuous furnace blower operation for circulating air throughout the enclosure. System switch 107 is also located within the thermostat 40 and is used for selecting the off position, the on position or the emergency heat position for operation of the combination furnace and heat pump system. Fan switch 96 which is a double bar slide type switch has terminals 98, 100, 102, 104, 106 and 108. Terminal wire 274 connects terminal 98 to terminal 100, terminal wire 276 connects terminal 102 to 104 and terminal wire 278 connects terminal 104 to terminal 106. When the fan switch 96 is in the off position terminals 100 and 106 are respectively connected to terminals 102 and 104 by the system switch. When the fan switch 96 is in the on position terminal 98 is connected to terminal 100 and terminal 108 is connected to terminal 106 by the switch. When fan speed switch is in the on position power received through wire 201 travels through the slide bar of the fan switch 96 to terminal 106 which then energizes wire 218 which energizes the furnace blower relay thereby allowing the furnace blower to operate continuously. In the automatic position fan switch 96 energizes wire 218 to the furnace blower relay only when power is received through wire 272 to switch terminal 100.

The system switch 107 has 8 terminals; 109, 110, 112, 114, 116, 118, 120 and 122. Terminal 109 is connected by wire 216 to terminal 90 of the optimizer relay and to gas valve 52. Terminal 110 is connected to wire 201 which is connected to terminal 108 of fan speed switch 96 and to wire 208 connected to secondary of transformer 50. Terminal 112 is connected by wire 268 to heating anticipator 126, to wire 252, to reversing relay 80 and to normally open defrost relay D contacts 82. Terminal 114 is connected by wire 270 to normally open heating thermostat 124. Terminal 116 is connected by a jumper wire to terminal 120 which is connected by wire 272 to terminal 100 of the fan speed switch 96 and by wire 262 to the terminal 89 of the switching relay 86. Terminal 118 of the system switch 107 is jumpered to terminal 122 of said switch which is connected by wire 264 to the first cooling thermostat 128, to cooling anticipator 130, and to second cooling thermostat 132. Wire 262 then connects the first cooling thermostat 128, cooling anticipator 130, and second cooling thermostat 132 to terminal 89 of the switching relay.

Within switching control 31 compressor relay 94 is connected to wire 256 which is connected to wire 210 connected to the secondary transformer 50 and also connected by wire 258 to normally closed low pressure switch 92. Low pressure switch 92 is connected by wire 260 to terminal 88 of switching relay 86. Terminal 90 of switching relay 86 is connected by wire 216 to gas valve 52 of furnace 20. Also connected by wire 216 are normally open defrost relay C contacts 84 and terminal 109 to the system switch 107 of thermostat 40. Normally open defrost relay C contacts 84 and normally open defrost relay D contacts 82 are connected to each other by wire 201 and by that same wire to wire 208 connected to the secondary of transformer 50. Reversing relay 80 is connected by wire 254 to wire 200 and by wire 252 to normally open defrost relay D contacts 82 and to cooling thermostat 128 as well as heating anticipator 126 which is connected by wire 268 to terminal 112 of system switch 106.

Operation

Power is received from terminals 280 and 282, and conducted to furnace 20 and the heat pump 21. In heat pump 21, when compressor relay 94 is energized compressor relay A contacts 60 and compressor relay B contacts 62 close completing the circuit such that the compressor motor 58 may be energized to operate the heat pump. It will be noted that crankcase heater 56 is energized at all times. Normally closed defrost relay A contacts 66 are connected such that when the defrost relay is not energized the outdoor fan motor will operate. When the defrost relay is energized when the heat pump is being operated in the defrost mode then normally closed defrost relay A contacts 66 will open and the outdoor fan motor will not operate. Simultaneously, when the defrost relay is energized defrost relay B contacts 68 will be closed energizing wires 236 and 240 and normally closed defrost timer B contacts 72, wire 242 and defrost thermostat 74. Current is also supplied from wire 202 to wire 238 to normally open defrost timer A contacts 70. Defrost timer 78 is continuously energized through wires 202 and 250.

Defrost timer 78 is preset so that it periodically energizes defrost timer relay A and B contacts 70 and 72 at different time intervals such that power will be supplied to normally open defrost thermostat 74. If defrost thermostat 74 senses the need for defrost, that is the temperature of the condenser line connecting the discharge from the outdoor coil to the compressor is below freezing, then defrost relay 76 will be energized through defrost timer A contacts 70. Five minutes thereafter the defrost timer automatically opens defrost timer relay B contacts 72 such that power will be discontinued to defrost relay 76 notwithstanding the defrost thermostat 74 has not come up to temperature prior to that time. When defrost relay 76 is energized initially, defrost relay B contacts 68 are closed allowing current to be supplied through wire 202, wire 230, through closed defrost relay B contacts 68, wire 236, wire 240, through normally closed defrost timer B contacts 72, and wire 242 to defrost thermostat 74. If defrost thermostat 74 remains engaged because the refrigerant temperature is below 31° F., then wire 244 remains energized and defrost relay 76 continues to hold the defrost relay B contacts 68 in the normally closed position until defrost timer 78 opens normally closed defrost timer relay B contacts 72 to break the cycle. At that time defrost relay 76 will release allowing normally open defrost relay B contacts 68 to become open. Thereafter as soon as the defrost timer relay B contacts 72 return to their normally closed position which occurs approximately 10 to 15 seconds after they have been opened, current will not be supplied to the defrost relay or the defrost thermostat until the defrost timer reaches its next cycle.

Furnace 20 receives power from wires 200 and 202 to energize transformer 50 and the furnace blower motor (not shown). The primary coil of transformer 50 is connected to wires 204 and 206 and the secondary coil of transformer 50 is connected to supply electricity to the control circuit portion of the overall circuit of furnace 20 as well as to the thermostat 40 and switching control 31. Typically the secondary coil supplies 24 volt AC current. Within the furnace this 24 volt current is utilized to control the furnace blower relay which actuates the furnace blower (not shown) and the gas valve which controls the flow of natural gas or other fuel to the furnace. From the secondary coil of transformer 50 power is supplied to wire 201 to thermostat 40. This wire supplies power to terminal 108 of fan switch 96 such that when the fan switch is in the on position the switch connects terminal 108 and terminal 106 of the switch such that wire 218 and furnace blower relay 54 are energized through wire 201. When the fan switch 96 is in the automatic position, wire 218 can be energized only by supplying power to terminal 100, through the fan switch to terminal 102, through jumper 276 to terminal 104, then through jumper 278 to terminal 106 to wire 218 and to the furnace blower relay 54.

Wire 201 from secondary coil of transformer 50 also supplies power to terminal 110 of system switch 107. When system switch 107 is in the off position no power is supplied to any other component of the system switch or the switching control therethrough. When system switch 107 is in the on position, the system switch connects terminals 110, 114 and 118 such that the power from wire 201 travels through the system switch to wire 270 to normally open heating thermostat 124 and to wire 264 to normally open first cooling thermostat 128, to cooling anticipator 130 and to second cooling thermostat 132. In the on position terminal 116 is also connected to terminal 112 such that should heating thermostat 124 close sensing that a heating need is required by the enclosure current will be supplied from wire 201 through system switch 107 to wire 270 through heating thermostat 124 through wire 268 to terminal 112 of system switch 107. From terminal 112 power will continue to terminal 116, to terminal 120 to wire 262 and from there to the terminal 89 of the optimizer relay. Should first cooling thermostat 128 sense a cooling need then reversing valve relay 80 will be energized through wire 264 cooling thermostat 128 and wire 252 such that the heat pump will then be put in the cooling mode of operation. Should further cooling be anticipated by second cooling thermostat 132, the second cooling thermostat being set to close at approximately 1 degree Fahrenheit lower than the first cooling thermostat, then through wire 264 second cooling thermostat 132 will be energized which will then energize wire 262 leading to terminal 89 of switching relay. A cooling need will only be sensed when the outdoor temperature is high enough such that the combination furnace and heat pump system will be operated utilizing the heat pump. Hence the switching relay may only contact terminal 88 connected to the compressor when a cooling need is determined.

If system switch 107 is in the emergency heat position power is supplied from terminal 110 of the switch through terminal 114 to wire 270, through heating thermostat 124 if it is closed to wire 268, and then to terminal 112 to system switch 107. From terminal 112 power will be supplied through the switch to terminal 109 to wire 216 which energizes gas valve 52. Consequently, in the emergency heat position when heating thermostat 124 is closed power is supplied directly to gas valve 52 of furnace 20 bypassing the switching relay.

Switching control 31 receives power to defrost relay C contact 84 and defrost relay D contacts 82 from wire 201. Power may also be received through wire 262 when either a heating need or cooling need is sensed. Power may also be received through wire 252 to defrost relay D contacts 82 as well as reversing relay 80. When a heating need is sensed and heating thermostat 124 closes and when the system switch is in the on position, reversing valve relay 80 is not activated through wire 252 since heating anticipator 126 is of sufficient resistance that insufficient current passes therethrough to activate the reversing valve relay. The heat pump is preset such that the reversing valve relay is in the heating mode of operation for the heat pump and need only be energized when the cooling mode of operation is desired. When heating need is determined, wire 262 is energized through wire 268 and system switch 106 and then energizes terminal 89 of switching relay 86. The switching relay is controlled by the temperature of the outdoor ambient air such that when temperature is above a predetermined level, switching relay 86 connects terminal 89 to terminal 88, such that the heat pump is energized through wire 260 to low pressure switch 92 and through wire 258 to compressor relay 94. When the outdoor air temperature is below a predetermined level, then switching relay 86 connects terminal 89 to terminal 90 such that furnace operation will be commenced by actuating gas valve 52 when a heating need is sensed. Outdoor bulb 39 (FIG. 1) controls the switching relay selection by sensing the ambient air temperature.

When defrost relay 76 is energized during the defrost cycle previously explained, normally open defrost relay C contacts 84 and normally open defrost relay D contacts 82 will be energized thereby completing the circuits such that reversing valve relay 80 receives power from wire 201 to put the heat pump in the cooling mode of operation and that wire 216 connected is energized through defrost relay C contacts 84 to energize the gas valve such that the furnace is operated. This defrost operation continues with the indoor coil absorbing heat from the furnace coil is free from ice and using said heat to defrost the outdoor coil until the defrost thermostat 74 senses sufficiently high refrigeration temperature to open and thereby disconnect the defrost relay. Consequently defrost relay C contact 84 and defrost relay D contact 82 resume their normally open positions. Defrost operation will also discontinue at such time as defrost timer 78 through defrost timer B contacts 72 automatically deenergizes defrost relay 76.

There has been described herein an improved method of coordinately controlling the combined operation of a furnace and a heat pump. The switching control is set so that when the outdoor ambient temperatures are above a predetermined level and the heat pump is a more efficient means of heating the enclosure the switching relay operates the compressor relays such that the heat pump is utilized to supply heating to the enclosure. When the outdoor temperature is below a predetermined level the outdoor bulb 39 of the switching relay 86 controls the switching relay such that terminal 90 of the switching relay is energized upon a heating demand being sensed and the furnace is activated through gas valve 52 to supply heat to the enclosure. When defrost is required, defrost relay 76 operates to energize the reversing valve relay 80 to put the heat pump in the cooling mode of operation and simultaneously energizes gas valve 52 to actuate the furnace for supplying both heated air to the enclosure and heated air to the indoor coil 34 of the heat pump for supplying additional heat for defrosting outdoor coil 36. It can be seen that this switching control is readily adaptable to existing furnace heat pump combinations by merely making the appropriate connections with the thermostat, the furnace and the heat pump.

The invention has been described in detail with particular reference to preferred embodiment thereof, but it will be understood that variations and modifications can be effected within the spirit and scope of the invention.

What is claimed is:

1. A control circuit for a combination heating means and heat pump for conditioning an enclosure wherein the heating means has an actuating device to commence the generation of heat and blower actuated by a blower relay which circulates air through the area to be conditioned and wherein the heat pump has a compressor motor for operating the compressor, an outdoor fan motor for circulating fluid in a heat exchange relationship with an outdoor heat exchanger means including a defrost relay for defrosting the outdoor coil, an indoor coil mounted in communication with the air circulated by the blower and a reversing valve actuated by a reversing valve relay which comprises:

a temperature sensing means for making an electrical connection when heating is required in the enclosure;

means for supplying an electric current to the temperature sensing means;

switching means electrically connected to the temperature sensing means for selectively energizing either the compressor motor of the heat pump or the actuating device of the heating means depending on the temperature of the ambient fluid in communication with the outdoor heat exchanger, including no delay other than that which naturally occurs between switching from heating means heating to heat pump heating and the means for actuating the heating means for defrost includes no delay other than that which naturally occurs through switching; and means for actuating the heating means to provide heat to the indoor coil when the means for defrosting the outdoor coil is energized including termination means for discontinuing defrost before heat pump refrigerant temperature or pressure reached excessive levels.

2. The invention as set forth in claim 1 wherein the switching means includes a temperature sensitive switch which when the thermostat calls for heating energizes the heat pump compressor if the ambient air temperature is above a predetermined level and actuates the heating means if the ambient air temperature is below a predetermined level.

3. The invention as set forth in claim 2 wherein the means for actuating the heating means for defrost includes defrost relay contacts being mounted such that when the defrost thermostat senses a no frost condition the defrost relay will be disengaged allowing the heat pump to be operated to provide heat to the enclosure.

4. The invention as set forth in claim 1 wherein the termination means is a defrost thermostat mounted on the refrigerant discharge line from the outdoor coil preset to terminate heating means operation upon the completion of defrost prior to excessive refrigerant temperatures or pressures occuring in the heat pump system.

5. A system for conditioning air in an enclosure, said air having an indoor air temperature which may be different from the outdoor air temperature which comprises:

a heating means having a blower for circulating air through a duct to the enclosure and having heat exchanger means for heating said air;

a heat pump having an outdoor heat exchanger, an indoor heat exchanger mounted in heat exchange relationship with the air in the duct and reversing means for defrosting the outdoor heat exchanger;

a thermostat for determining if heating or cooling is required in the enclosure; and control means for coordinately controlling the heat pump and the heating means, said control means being responsive to the thermostat and said control means selecting either the heat pump or the heating means to supply heating to the enclosure dependent on the temperature level of the ambient outdoor air, said control means activating the heat pump if the outdoor air is at a higher temperature than a predetermined level and the furnace of the outdoor air is at a lower temperature than a predetermined level, said control means including defrost means which automatically cycles the heating means on and reverses the heat pump notwithstanding the outdoor air temperature when the outdoor heat exchanger requires defrosting so that heat from the heating means is used with the heat pump for defrost and which automatically terminates heaing means operation upon the completion of defrost being detected and prior to excessive heat pump refrigerant pressures occurring as a result of the heat supplied to the indoor coil by the heating means after the outdoor coil is free of ice and the heat pump is unable to dissipate the heat received, wherein there are no built-in delays for cooling or heating between the switching among heating means operation, heat pump operation and defrost operation.

6. The invention as set forth in claim 5 wherein the defrost means includes a defrost thermostat in series with a defrost relay, said thermostat actuating the relay when defrost is required and said defrost relay closing the defrost relay contacts, to cycle the heating means on and to reverse the heat pump.

7. The invention as set forth in claim 4 wherein the heating means is a fuel fired furnace.

8. A method of controlling the synchronized operation of a combination heating means and heat pump with an outdoor coil in communication with outdoor air for conditioning air within an enclosure which comprises the steps of:

operating the heat pump to supply heated air to the enclosure when the temperature of the outdoor air is above a predetermined level;

energizing the heating means to supply heated air to the enclosure when the outdoor temperature is below a preselected level;

cycling the heating means such that the heating means is energized when the heat pump is reversed for defrosting, the heat pump utilizing part of the heat supplied by the furnace for defrost; and terminating the step of cycling the heating means during defrost upon a defrost thermostat sensing no ice on the outdoor coil; and switching the heating means and heat pump among the steps of operating, energizing, terminating and cycling without any thermal delays.

9. A control circuit for a combination heat pump and furnace for conditioning an enclosure, the furnace having a means for heating air being circulated therethrough by a furnace blower and the heat pump having an outdoor coil, an outdoor coil fan motor, a compressor motor actuated by compressor relay, and a reversing valve actuated by a reversing valve relay, the reversing valve being normally in the position for the heat pump to be operated in the heating mode, and defrost means including a defrost relay, and a thermostat for determining when heating or cooling is required which comprises:

a temperature sensitive relay connected to the thermostat for actuating either the furnace means for heating air or means for actuating the compressor, said temperature sensitive relay being dependent on the outdoor air temperature;

first defrost relay contacts in a normally open position connected to the reversing valve relay;

second defrost relay contacts in a normally open position connected to the furnace means for heating air such that when the defrost relay is actuated the heat pump will operate in the cooling mode and heat from the furnace will be used to defrost the outdoor coil; and a defrost thermostat in series with the defrost relay for sensing the presence or absence of ice on the outdoor heat exchanger for discontinuing defrost operation, said switching between heat pump heating, furnace heating and defrost occurring without any thermal delays.

10. The invention as set forth in claim 9 wherein the thermostat is connected to the reversing valve relay such that when a cooling need is sensed the compressor will be operated through the temperature sensitive relay and the reversing valve relay will be operated through a separate thermostat connection.

* * * * *